United States Patent [19]

Sundberg

[11] Patent Number: 4,537,842
[45] Date of Patent: Aug. 27, 1985

[54] THIN TUBULAR POSITIVE ELECTRODES FOR LEAD-ACID BATTERIES AND METHOD OF MAKING SAME

[76] Inventor: Erik G. Sundberg, 447 Union St., Newtown Crossing, Pa. 18940

[21] Appl. No.: 504,472

[22] Filed: Jun. 15, 1983

[51] Int. Cl.³ .............................................. H01M 4/76
[52] U.S. Cl. .................................... 429/140; 429/238
[58] Field of Search ......................... 429/140, 141, 238

[56] References Cited

U.S. PATENT DOCUMENTS

| | | |
|---|---|---|
| 333,292 | 12/1885 | Fitz-Gerald et al. ............... 429/130 |
| 359,934 | 3/1887 | Main ..................... 429/228 |
| 644,050 | 2/1900 | Beckmann ..................... 204/2.1 |
| 745,604 | 12/1903 | Hartung ............... 429/140 |
| 962,870 | 6/1910 | Washburn ........................ 429/130 |
| 3,082,280 | 3/1963 | Sundberg et al. ..................... 136/43 |
| 3,318,794 | 5/1967 | Kiyohara et al. .................... 204/290 |
| 3,881,954 | 5/1975 | Maskalick ............................. 136/27 |
| 3,887,398 | 6/1975 | Singman ................................ 136/26 |
| 4,250,233 | 2/1981 | Jeanneret ............................ 429/238 |

*Primary Examiner*—Donald L. Walton
*Attorney, Agent, or Firm*—Hamilton, Brook, Smith & Reynolds

[57] ABSTRACT

Improved positive electrodes for lead-acid batteries are disclosed, in which the said electrodes are initially fabricated such that:

(1) the ratio between a calculated weight of formed, dry active material filled into a tube member and the weight of its corresponding lead spine is restricted to a maximum value of 1.5:1;

(2) the ratio between the lateral cross-sectional area enclosed by a tube member and the lateral cross-sectional area of its corresponding lead spine is restricted to a maximum value of 5:1; and (3) the distance between the inner surface of a tube wall and the surface of its corresponding lead spine is restricted to a maximum value of 2.5 mm; for electrodes designed for use at the 5-hour discharge rate or greater, this distance is restricted to a maximum value of 1.8 mm.

Thereafter the electrodes are subjected to a deliberate electro-chemically-induced corrosion of outer surface of the spines, to produce zones of high-density $PbO_2$ immediately surrounding and in intimate contact with the spines. These high-density zones inhibit further corrosion of the spines. In this manner thinner-than-conventional tubular positive electrodes may be provided having a cycle life characteristic at least as good as that of conventional electrodes, and battery cells utilizing a plurality of these electrodes will demonstrate a substantially improved energy density characteristic.

17 Claims, 11 Drawing Figures

THIN TUBULAR POSITIVE ELECTRODES FOR LEAD-ACID BATTERIES AND METHOD OF MAKING SAME

BACKGROUND OF THE INVENTION

It has been recognized by the battery art that the volumetric energy density of lead-acid batteries may be improved by increasing the number of electrodes present in a given cell volume. It has also been recognized that this may be accomplished through the provision of thinner electrodes. This principle has been used with "flat" or "pasted" type positive electrodes. However, it has not been successfully applied to tubular positive electrodes which are intended for heavy-duty, deep-discharge applications.

The life of a tubular positive electrode is primarily limited by the corrosion rate of the lead grid spines. Should a conventional tubular electrode be "scaled down" proportionately into a thinner configuration the corrosion rate will be increased due to the thinner active material portions surrounding the spines and, since the spines will also be proportionally thinner, total corrosion of the spines, resulting in failure of the electrode, will take place more quickly.

SUMMARY OF THE INVENTION

This invention relates to the lead-acid battery art, and particularly to tubular positive electrodes for use in lead-acid batteries.

It is a first object of the invention to provide tubular positive electrodes for lead-acid batteries having a cycle life in excess of that demonstrated by conventional tubular positive electrodes.

It is a second object of the invention to provide tubular positive electrodes for lead-acid batteries which are thinner than conventional tubular positive electrodes, thereby to improve utilization of the active material and to permit the use of an increased number of electrodes in a standard cell container.

It has been found that the above and other objects may be realized by the fabrication of positive tubular electrodes wherein:

(1) the ratio between a calculated weight of formed, dry active material filled into a tube member and the weight of its corresponding lead spine is restricted to a maximum value of 1.5:1;

(2) the ratio between the lateral cross-sectional area enclosed by a tube member and the lateral cross-sectional area of its corresponding lead spine is restricted to a maximum value 5:1, and (3) the distance between the inner surface of a tube wall and the surface of its corresponding spine is restricted to a maximum value of 2.5 mm; for electrodes intended for use at the 5-hour rate or greater, this distance is restricted to a maximum value of 1.5 mm.

Thereafter, the electrodes are subjected to deliberate electrochemical action whereby an outer portion of each lead spine is corroded into a dense form of $PbO_2$, thereby providing a protection against further severe spine corrosion.

DETAILED DESCRIPTION OF THE INVENTION

Figure 1:
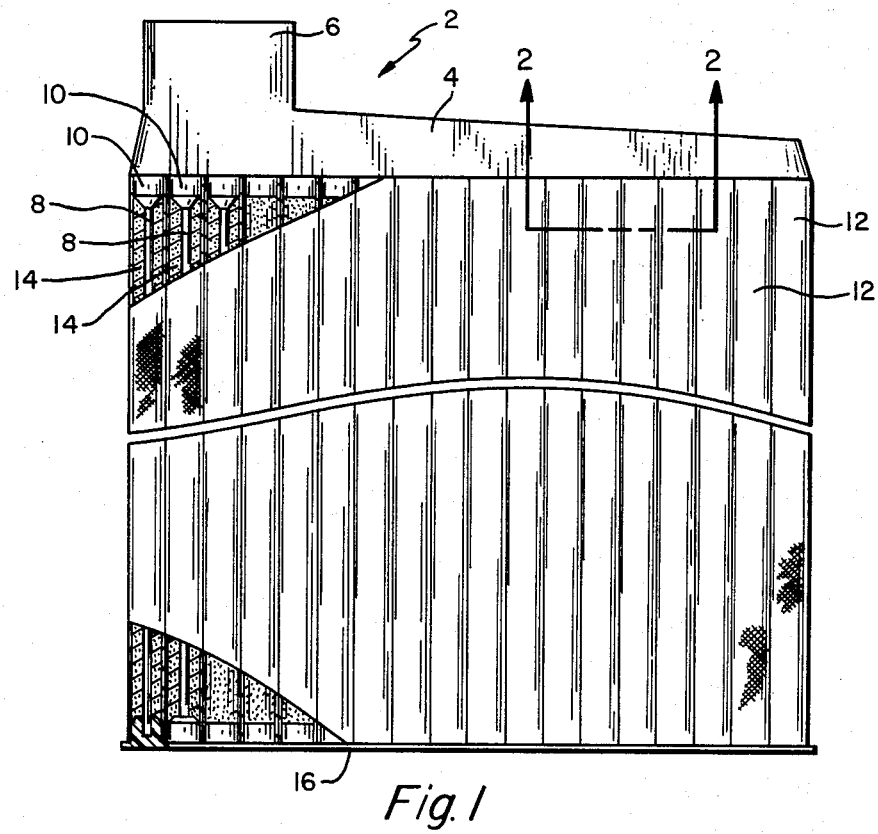
FIG. 1 is a front view, in partial cross-section, of a positive tubular electrode of the present invention as initially fabricated.
Figure 2:
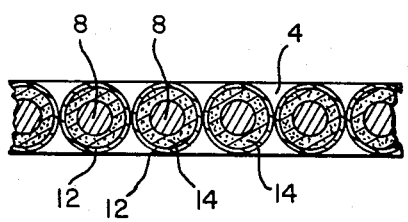
FIG. 2 is a fragmentary cross-sectional view, taken along the line 2—2 of FIG. 1.

Referring in detail to the Drawing, FIG. 1 illustrates, in partial cross-section, a positive electrode of the invention, after initial fabrication but prior to any electrochemical action, generally denoted by the arrow 2. Electrode 2 includes a grid structure fabricated from a lead alloy and comprising a top bar 4, a lug 6, and a plurality of spaced apart spines as 8 depending from the top bar 4. Each of the depending spines as 8 may present an enlarged portion as 10 at its upper part, where the spine becomes joined to the top bar 4. Also included is a plurality of porous tube members as 12 which are received over the spines as 8 in fitted relationship with the enlarged portions as 10. Active material portions as 14, which may primarily comprise $PbO_2$ made from milled lead oxides, are received in the tube members as 12 to surround and enclose the spines as 8. A bottom bar part 16 is engaged in lower ends of the tube members, in fitted relationship therewith. FIG. 2 illustrates, in fragmentary form, a lateral cross-section of positive electrode arrow 2.

It is known to the battery art that the utilization, during discharge, of positive active material ($PbO_2$) in a tubular electrode will be substantially higher at the surface of an active material portion as 14 than at the interior of the said portion. $PbSO_4$, which is formed during a discharge, occupies a greater volume than does $PbO_2$. As the discharge progresses, therefore, and an increasing amount of $PbSO_4$ is formed, the rate of transport of the electrolyte acid ($H_2SO_4$), necessary for the discharge reaction, will decrease. In addition, water which is evolved as a byproduct of the reaction will have decreasing freedom to escape from the interior of the active material portion, and thus will have a tendency to dilute the electrolyte. This is of particular concern when relatively high discharge rates are desired.

At the 5-hour rate, for example, the utilization of active material at the surface of an active material portion of a conventional electrode may be as high as 50%, but will decrease toward the interior of the active material portion to some lesser percentage which depends primarily upon the density of the active material. For example, in a conventional electrode employing tube members having an inner diameter of 8.4 mm, spines 2.8 mm in diameter, and active material having a density of 4.0–4.4 gm/cm$^3$, active material utilization at the 5-hour rate may be as low as 10% at a distance of 1.5–1.8 mm from the surface of an active material portion, and there may be no utilization at all of that active material immediately adjacent to the spine surface.

If the active material density were reduced to 3.5–3.8 gm/cm$^3$, utilization at a distance of 1.5–1.8 mm from the surface of the active material portion might be increased to as much as 20%, and there would be some utilization even adjacent to the spine surface. However, this utilization adjacent to the spine surface means that there is acid transport to the spine surface, and thus during charging the lead of the spines will gradually be corroded into PbO$_2$.

Corrosion of the spines is almost always the limiting factor in the life of a tubular positive electrode. A relatively high density active material tends to inhibit such corrosion. However, there are certain disadvantages to its use, to wit:

(1) high density oxides are relatively expensive,
(2) active material utilization toward the interior of an active material portion is relatively low, thus decreasing capacity or volumetric energy density, and
(3) there is created the risk of bursting tubes, since expansion of the active material (when PbO$_2$ is transformed into PbSO$_4$ or when the surface of the Pb spine is transformed into PbO$_2$) will produce increased pressures which are not easily absorbed by compaction of the active material.

Therefore, an ideal tubular electrode will include active material portions which may be divided into two zones:

(1) high-density zones immediately adjacent to the spines, and
(2) low-density zones comprising the remainder of the active material portions.

Such an electrode might also include tube members smaller in diameter than those included in conventional electrodes. Since the utilization of the active material in the low-density zones would be improved substantially over that of active material of normal density employed homogeneously in active material portions of conventional electrodes, and since thinner tube members would allow the use of more tube members for electrode and more electrodes per cell thus providing a substantially larger surface area of positive active material portions, volumetric energy density, i.e. cell capacity, may be increased. However, the high-density zones of active material must be present in order to inhibit spine corrosion, which would otherwise be catastrophically rapid. It is toward this end that the present invention is directed.

Figure 3:
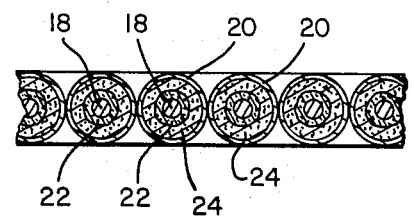
FIG. 3 is a view similar to FIG. 2, but showing high- and low-density zones of active material.

FIG. 3 illustrates, in fragmentary form, a lateral cross-section of a tubular positive electrode characterized by the inclusion of high-density and low-density zones of active material. In this Figure numerals as 18 denote the spines, numerals as 20 the tube members, numerals as 22 the high-density zones, and numerals as 24 the low-density zones.

Construction of an electrode according to this invention requires the fabrication of a basic electrode, such as that pictured in FIGS. 1 and 2, according to certain criteria, followed by a deliberately-induced spine corrosion process which will be discussed in detail below. Design criteria are as follows:

CRITERION 1: The ratio between a calculated weight of formed, dry active material (PbO$_2$), when filled into a tube member (as 12, FIG. 1) to constitute an active material portion (as 14), and the weight of its corresponding surrounded lead spine (as 8) (exclusive of any enlarged upper portion as 10) is restricted to a maximum value of 1.5:1.

CRITERION 2: The ratio between the lateral cross-sectional area enclosed by a tube member (as 12) to the lateral cross-sectional area of its corresponding enclosed lead spine (as 8) (exclusive of any enlarged upper portion as 10) is restricted to a maximum value of 5:1.

CRITERION 3a: For electrodes designed for use at relatively high discharge rates, that is, the 5-hour rate or greater, the distance between the inner surface of the wall of a tube (as 12) and the surface of its corresponding spine (as 8) (exclusive of any enlarged upper portion as 10) is restricted to a maximum value of 1.8 mm, or, alternatively, CRITERION 3b: for electrodes designed for use a relatively low discharge rates, i.e. less than 5-hour rate, the distance between the inner surface of the wall of a tube (as 12) and the surface of its corresponding spine (as 8) (exclusive of any enlarged upper portion as 10) is restricted to a maximum value of 2.5 mm.

Fabrication of electrodes according to the design criteria disclosed above will provide electrodes having a relatively low active material density. It will then be necessary to provide the high-density active material zones (as denoted by numeral 22, FIG. 3), immediately surrounding the spines.

It is known to the art that active material (PbO$_2$) can be produced by the electrochemical oxidation of lead; this may be described as a corrosion process wherein the PbO$_2$ is the product of corrosion. It has been found that PbO$_2$ produced in this manner will always have a higher density than that produced from milled oxides. Therefore, if the spines as 8 in FIGS. 1 and 2 were to be subjected to a corrosion process, the high density zones as 22 (FIG. 3) would be produced.

Some spine corrosion is inherent in tubular electrodes. In fact, most tubular electrodes ultimately fail because the spines have been corroded through. The use of relatively low density active material will only accelerate this corrosion, since the electrolyte acid will have easier access to the spines.

As previously disclosed, however, it is known that the active material immediately surrounding the spines may be very poorly utilized (if it is in fact utilized at all), particularly at higher discharge rates. Therefore it has been found that this inner portion of active material may be replaced with lead, during fabrication of an electrode, by the simple expedient of providing thicker spines (as 8; FIGS. 1 and 2). This forms a basis for the design criteria specified above.

As also previously disclosed high density active material will act as an inhibitor to spine corrosion and PbO$_2$ produced by spine corrosion will be of a relatively high density. Therefore, when an electrode of the invention, fabricated according to the design criteria disclosed above, is subjected to several charge-discharge cycles, inner "sheaths" of relatively high density PbO$_2$ immediately surrounding the spines are produced. These so-called "sheaths" correspond to the high-density active material zones as 22 of FIG. 3. Since these "sheaths" occupy greater volumes than the lead from which they were produced, and since the tube members as 20 exert restraining forces against the expansion of the active material, the active material in both the high-density zones as 22 and the low-density zones as 24 will become compacted as cycling is continued. Corrosion of the spines as 18 will continue to add $PbO_2$ to the high-density zones as 22. However, it has been found that the rate of this corrosion will decrease to an extremely low rate once the active material in the high-density zones as 22 reaches a density value of about 4.8 $gm/cm^3$, particularly in high discharge rate applications.

The numerical values for the distances and ratios specified in the design criteria above provide spines that are sufficiently thick so that they may be corroded to an extent such that a high-density zone of active material, having a density of at least 4.8 $gm/cm^3$, may be produced while still leaving a spine section having sufficient cross-sectional area to carry a required current. In addition, the criteria provide filled active material portions which ultimately correspond to the low-density zones as 24 of FIG. 3, and whose density will not increase due to compaction beyond a normal value for good utilization of this active material (e.g. 4.0 $gm/cm^3$).

It is pointed out that, depending upon the intended use of batteries made with electrodes of the invention, the corrosion process may be instituted in various ways. For example, in batteries intended for cycling operation, the corrosion process will take place during normal operation. In other cases it may be desirable to initiate the process by including one or more discharges in the assembly plant, perhaps during initial electrochemical formation of the electrodes. In still other cases, particularly where the batteries are intended primarily for standby or "float" applications, it may be desirable to include small quanitities of a forming/corroding agent in the formation electrolyte. This agent may be either organic or inorganic, and should be of a composition and amount which will be consumed or dissipated during operation, or which will be transformed into $H_2SO_4$. An example of an organic agent would be the addition of about 0.1% acetic acid to the forming electrolyte, which would cause the spines to corrode in a manner similar to Plante formation. Ultimately this acetic acid will be dissipated as carbon dioxide. Inorganic agents may include, for example, sulfurous acid. Even with the use of such agents it is recommended that at least one discharge be included in the formation process or shortly thereafter.

It is pointed out that the tube members as 12 (FIGS. 1 and 2) or as 20 (FIG. 3) must be capable of restraining internal pressures generated by the corrosion of the spines without bursting, i.e. they should preferably be able to expand to some degree. Tubes braided from glass fibers tend to burst from an expansion of approximately 10%. On the other hand, tubes should not be able to expand indefinitely, since there then would be insufficient support for the active material, and the density of both active material zones may even tend to decrease. An appropriate tube material would be braided or woven polyester; these are able to expand from 15% to 20%. It has been found that tubes of this nature will prevent the density of the low-density zone $PbO_2$ from increasing more than 20%. It is also possible to use higher densities of active material in filling if the tubes are made with very small diameters such that the weight ratio specified in Criterion 1 is no greater than 1.3:1.

Figure 4A:
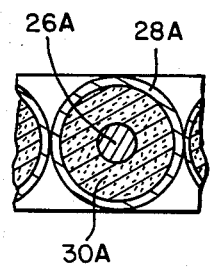
FIG. 4A is a lateral cross-sectional view of a one-tube portion of a conventional electrode immediately following initial fabrication.
Figure 4B:
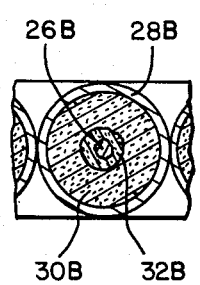
FIG. 4B is a view similar to FIG. 4A, but after the electrode has been subjected to 100–500 charge-discharge cycles.
Figure 4C:
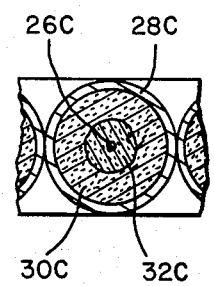
FIG. 4C is a view similar to FIGS. 4A and 4B, but after the electrode has been subjected to approximately 1500 charge-discharge cycles.

FIGS. 4A–4C show, for illustrative purposes, the evolution of a one-tube portion of a conventional tubular positive electrode at various stages in its life. FIG. 4A shows this portion immediately following initial formation, FIG. 4B shows this same portion after 100–500 charge-discharge cycles (the number of cycles will vary, depending upon the depth of discharge and other maintenance factors), and FIG. 4C shows this same portion after approximately 1500 cycles. Common numeral notation is used throughout these Figures, differentiated from Figure to Figure by the use of suffix letters A, B and C, corresponding to FIGS. 4A, 4B and 4C, respectively.

In these Figures numerals 26A–C denote spines, 29A–C denote the tube members, 30A–C denote active material portions as initially filled into the tubes, and 32B–C denote $PbO_2$ arising as a byproduct of spine corrosion.

FIG. 4A, as described above, represent an electrode portion of conventional construction immediately after initial formation. In FIG. 4B, some corrosion of the spine has taken place, and thus spine 26B is shown as having a smaller diameter than 26A (FIG. 4A). This corrosion has produced a zone of higher-density active material as a byproduct, denoted 32B. It will be recalled, however, that the density of filled active material 30A was relatively high, and therefore the corrosion of the spine has not been excessive. Thus, active material zone 32B is not very thick, and the density of this active material may not have approached the 4.8 $gm/cm^3$ value required to inhibit further corrosion. In any case, this zone 32B would not be sufficiently thick to effectively inhibit this corrosion.

When the electrode has been subjected to about 1500 cycles (or less, depending upon the depth of discharge and other maintenance factors), as shown in FIG. 4C, the spine 26C has almost been corroded through and that portion remaining is not of sufficient cross-sectional area to carry a desired current. Although the densities of zones 30C, 32C have increased somewhat over those of 30B and 32B, that of 32C, in particular (which is higher than that of 30C for reasons previously noted in the specification) will still not have reached the desired 4.8 $gm/cm^3$ value.

Figures 5A, 5B, 5C:
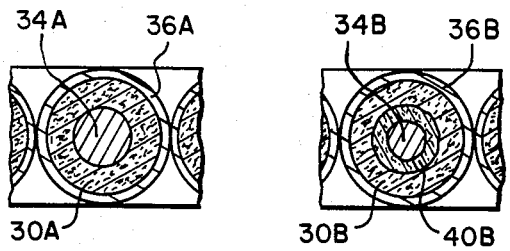
FIGS. 5A, 5B and 5C are views similar to FIGS. 4A, 4B and 4C, respectively, but showing a one-tube portion of an electrode of the invention.

In contrast, FIGS. 5A–5C illustrate in general a one-tube portion of an electrode of the invention at the same stage in its life. The same type of suffix differentiation of numeral notation has been employed, and numerals 34A–C denote the spines, 36A–C the tube members, 38A–C filled $PbO_2$ active material portions (previously referred to as "low-density zones" in connection with FIG. 3), and 40B–C the $PbO_2$ products of spine corrosion (previously referred to as "high-density zones" in connection with FIG. 3).

It is pointed out that FIG. 5A illustrates this portion immediately following initial electrochemical formation and that neither forming agents nor discharge were employed in this formation. Thus no $PbO_2$ products of corrosion appear in this Figure.

FIG. 5B spine 34B has corroded quite a bit, more so than had spine 26B in FIG. 4B. This is because of the lower density of the filled active material (to satisfy Criterion 1) and the larger spine diameter (to satisfy Criterion 2, 3a/b). Low-density active material 38B has been compacted somewhat, and the density of the $PbO_2$ corrosion product 40B is approaching the 4.8 $gm/cm^3$ value.

In FIG. 5C spine 34C has corroded even more, but the rate of corrosion will now be very slow because the density of the $PbO_2$ corrosion product has equalled or exceeded 4.8 gm/cm$^3$ as previously disclosed. Spine 34C is still of sufficient cross-sectional area to carry a desired current.

The following numerical examples are presented to further illustrate the principles embodied in the invention.

EXAMPLE 1

This example describes an electrode designed for use at the 12-hour rate. Conventional round tube members, each having an inner diameter of 8.4 mm are employed. Each tube member thus encloses a space, the lateral cross-sectional area of which is $$A_T = \pi r_T^2 = \pi(4.2 \text{ mm})^2 = 55.4 \text{ mm}^2 = 0.554 \text{ cm}^2.$$

Spines having a 4.0 mm diameter are employed. The cross-sectional area of each spine is $$A_S = \pi r_S^2 = \pi(2 \text{ mm})^2 = 12.57 \text{ mm}^2 = 0.1257 \text{ cm}^2$$

The ratio called for in Criterion 2 is $$A_T : A_S = 4.4 : 1$$

which satisfies this criterion.

Spine weight per unit of length, using the standard density for lead $\delta_S$ of 11.1 gm/cm$^3$, is $$W_S = (A_S)(\delta_S) = (0.1257)(11.1) = 1.395 \text{ gm/cm}$$

Each tube is filled with active material having a calculated formed, dry density $\delta_A$ of 3.3 gm/cm$^3$. Weight of this active material per unit of length is $$W_A = (A_T - A_S)(\delta_A) = (0.554 - 0.1257)(3.3) = 1.41 \text{ gm/cm}$$

The ratio called for in Criterion 1 is $$W_A : W_S = 1.011 : 1$$

which satisfies this criterion.

The distance D between the spine surface and the inner wall of the tube member is $$D = r_T - r_S = 4.2 - 2.0 = 2.2 \text{ mm}$$

which satisfies criterion 3b.

Were the same tube size, which is one of today's standard sizes, to be used in a conventional electrode the spine diameter would be 2.8 mm and the diameter of the filled active material would be 3.8 gm/cm$^3$. These values would satisfy none of the criteria.

In a low rate design, such as that presented in Example 1, the initial capacity of an electrode of the invention may be somewhat lower than that for a conventional electrode if the tube size is held constant for both. This is because some of the $PbO_2$ active material of the conventional electrode is replaced by lead in the electrode of the invention. However, that active material present in the electrode of the invention will be utilized more effectively than would that of the conventional electrode, because of its lower density. In addition, it may be advisable to include forming agents in the formation electrolyte to accelerate the initial corrosion of the spines of the invention electrode, since at lower discharge rates some of the $PbO_2$ corrosion product will be utilized as well. This may make the capacity of the invention electrode equivalent to that of conventional electrode, at least at these lower rates.

After corrosion equivalent to that produced by 100–500 cycles has taken place the spines of the invention electrode will have corroded to a diameter of approximately 2.8 mm, and about 0.8 gm/cm of "new" $PbO_2$, the corrosion product, will have been added to the electrode. This may have a density of about 5.0 gm/cm$^3$, providing a high-density zone which acts on an inhibitor against further corrosion. Again, it is pointed out that, because of the low discharge rate application (12-hour rate) it has been found that some of this "new" $PbO_2$ may be utilized during discharge, and thus it may make a positive contribution to the capacity of the electrode. The low-density zone active material may have been compacted to a density of 4.0 gm/cm$^3$.

Succeeding cycles will continue to corrode the spines, but to a much lesser degree than in the conventional electrode (because of the high-density zones surrounding the spines, which spines have been corroded at this point only to such an extent that their cross-sectional areas are equivalent to those of the spines of a conventional electrode at the start of its life). Therefore, the electrode of the invention will demonstrate a substantially longer cycle life than will an equivalent conventional electrode. If this electrode were to be used at higher rates its capacity would actually be greater than that of the conventional electrode, because of the greater conductivity of the thicker spines and the better utilization of the active material.

Perhaps the greatest advantage of this invention is that it allows the utilization of smaller tubes, thus producing thinner electrodes. This in turn makes it possible to increase the volumetric energy density of lead-acid batteries having tubular positive electrodes, as disclosed below. Such batteries are singularly appropriate for motive power applications, for example.

EXAMPLE 2

In this example, disclosing electrodes intended for high discharge rates, tubes having an inner diameter of 6.0 mm, are employed. Each of these tubes will enclose a space, the lateral cross-sectional area of which is $$A_T = \pi r_T^2 = \pi(3.0)^2 = 28.3 \text{ mm}^2 = 0.283 \text{ cm}^2$$

Spine diameter is selected as 2.8 mm, and the lateral cross-sectional area of each spine is $$A_S = \pi r_S^2 = \pi(1.4)^2 = 6.16 \text{ mm}^2 = 0.0616 \text{ cm}^2$$

The ratio of the areas, as called for in Criterion 2, is $$A_T : A_S = 4.6 : 1,$$

which satisfies this criterion.

Spine weight per unit of length, again using 11.1 gm/cm$^3$ as the density of lead $\delta_S$, is $$W_S = (A_S)(\delta_S) = (0.0616)(11.1) = 0.684 \text{ gm/cm}$$

Each tube is filled with active material having a density $\delta_A$ of 3.3 gm/cm$^3$. Therefore the weight of the active material, per unit of tube length, is $$W_A = (A_T - A_S)(\delta_A) = 0.731 \text{ gm/cm}$$

The ratio of the weights, as called for in Criterion 1, is $$W_A:W_S = 1.069$$

which satisfies Criterion 1.

Distance D is $$D = r_T - r_S = (3.0 - 1.4) = 1.6 \text{ mm}$$

which satisfies Criterion 3a.

After approximately 100 deep-discharge cycles the spines will have corroded to a diameter of about 1.8 mm. This corrosion will have produced a high-density zone of active material, surrounding the spines, having a density of approximately 5.0 gm/cm$^3$, and the original, filled active material comprising the low-density zone will have been compacted to a density of about 4.0 gm/cm$^3$. After 1500 cycles the spine will still be approximately 1.0 mm thick.

In contrast, a conventional approach to an electrode having 6 mm internal diameter tubes would call for a spine diameter of 2.2 mm and a filling density of 4.0 gm/cm$^3$. This electrode would fail, due to complete spine corrosion, after only 500–1000 cycles.

The smaller tube size specified in this example, that is, 6.0 mm inner diameter or 6.5 mm outer diameter as opposed to "standard" tubes of 8.4 mm inner diameter 8.9 mm outer diameter, makes it possible to increase the number of tubes in an electrode of a standard width. For example, conventional 15-tube electrodes may be replaced by 22-tube electrodes of the invention, while still fitting in a standard cell container. This provides an increase in available surface area of about 5%, thus enhancing utilization of the active material in the invention electrode. In addition the lower filling density (3.3 gm/cm$^3$ as opposed to 4.0 gm/cm$^3$) also enhances utilization of the active material. Therefore, even though there is less active material in the invention electrode, it has been found that the thinner electrode of this example has approximately the same capacity at the 5-hour rate as does a conventional electrode. At the 2-hour rate the invention electrode may demonstrate an even greater capacity than the conventional.

Since the tubes are smaller, the overall thickness of the invention electrodes of this example will also be thinner. Therefore, it is possible to increase the number of positive electrodes which may be received in a standard container by about 50%. It is noted that the thicknesses of negative electrodes and of separator materials must be reduced proportionally, and that an adequate electrolyte reservoir must be provided. Since 50% more electrodes, each having the same capacity as a standard electrode at the 5-hour rate, may be included in a standard cell container the volumetric energy density of cells employing electrodes of the invention may be increased by 50% at the 5-hour rate, and by an even greater percentage at higher rates.

EXAMPLE 3

In this Example tubes having one-half of the outer diameter of conventional tubes, or 4.85 mm, are employed. The inner diameter of such tubes will be approximately 4.3 mm. Each tube will, therefore, enclose a space the lateral cross-sectional area of which is $$A_T = \pi r_T^2 = \pi(2.15)^2 = 14.5 \text{ mm}^2 = 0.145 \text{ cm}^2.$$

Spine diameter is selected as 2.0 mm, presenting a lateral cross-sectional area of $$A_S = \pi r_S^2 = \pi(1.0)^2 = 3.14 \text{ mm}^2 = 0.0314 \text{ cm}^2.$$

The ratio of these areas is $$A_T:A_S = 4.6:1$$

satisfying Criterion 2.

The weight of each spine, per unit of length, is $$W_S = (A_S)(\delta_S) = (0.0314)(11.1) = 0.340 \text{ gm/cm}.$$

The filling density $\delta_A$ of the active material is selected as 3.6 gm/cm$^3$. Therefore, the weight of the active material, per unit of spine length, is $$W_A = (A_T - A_S)(\delta_A) = (0.145 - 0.0314)(3.6) = 0.409 \text{ gm/cm}.$$

The ratio of the weights is $$W_A:W_S = 1.172:1$$

thus satisfying Criterion 1.

Distance D is $$D = (r_T - r_S) = (2.15 - 1.0) = 1.15 \text{ mm}$$

satisfying Criterion 3a.

Using the standard value of 100 A-h/kg of active material at the 5-hour rate, the capacity of this electrode (at the 5-hour rate) will be $$C = 0.0409 \text{ A-h/cm of tube length}.$$

A direct comparison may be made between these electrodes and standard European tubular electrodes. A conventional 85 A-h European electrode has 19 tubes, each 39.0 cm in length. This provides a total tube length of 741 cm, corresponding to a capacity of 0.115 A-h/cm of tube length.

These standard European electrodes may be replaced with electrodes of the invention as described in Example 3 above. Each electrode will include 38 tubes, each 39.0 cm in length, providing a total tube length of 1482 cm. Using the value 0.041 A-h/cm of tube length described above, the capacity of the electrode is calculated as 60.76 A-h.

Since the invention electrodes described in Example 3 above employ tubes having an outer diameter one-half that of conventional electrodes, a standard cell container may contain twice as many electrodes as conventional electrodes (provided that the thicknesses of negative electrodes and separator material are reduced accordingly). Therefore, cells including such electrodes may demonstrate a volumetric energy density more than 42% greater than conventional cells at the 5-hour rate.

At higher discharge rates the lower-density active material of the invention electrodes will be more efficiently utilized than will the higher-density active material of conventional electrodes and thus, at rates exceeding the 30-minute rate, the invention electrodes may demonstrate capacity equal to conventional electrodes. This, in turn, means that the volumetric energy density of cells utilizing invention electrodes as described in Example 3 may be double that of cells utilizing conventional electrodes. In addition, the shorter spacing between electrodes may reduce the internal resistance of the cell, and thus the improvement in observed volumetric energy density may be even greater.

As pointed out above, the thickness of negative electrodes and separator material must be reduced proportionately in cells employing positive electrodes of the invention. In cells having positive electrodes as disclosed in Example 3, for instance, negative electrodes should have a thickness of 2.2–2.3 mm, and the separator material should have a thickness of 0.8–0.9 mm. One suitable separator is the so-called YUMICRON TM material, which has a back web thickness of 0.11 mm. This may be obtained enclosed to an overall thickness of 0.8–0.9 mm.

In order to obtain proper filling of the smaller-diameter tube members made possible by this invention, the use of free-flowing granulated oxides is recommended. If conventional oxides are employed humidity must be carefully controlled during filling, and two frequencies of vibration may be required on conventional dry-filling machines. Alternatively, a wet-paste or slurry filling method may be employed.

When the volumetric energy density is increased in any lead-acid cell, there is always an accompanying risk that higher internal temperatures will be developed during cell operation. Heat is primarily developed during the charging process. Lead-acid battery cells commonly require an overcharge equivalent to 12–15% of capacity; much of this overcharge is wasted in heat generation and thus raises the internal temperature of the cells.

For this and other reasons charging efficiency should be as high as possible. One way to improve charging efficiency is to provide a plastic covering over the top bar and lug of the positive electrodes. One form of such covering, termed a "grid complement," is disclosed in U.S. Pat. No. 4,359,509 (Guimond et al); other forms may be used. Use of such a plastic covering may reduce the required overcharge to 5–8% of capacity, thereby retarding heat generation to a point such that cells employing positive electrodes of the invention may not reach temperatures any higher than would cells utilizing conventional positive electrodes.

Figure 6:
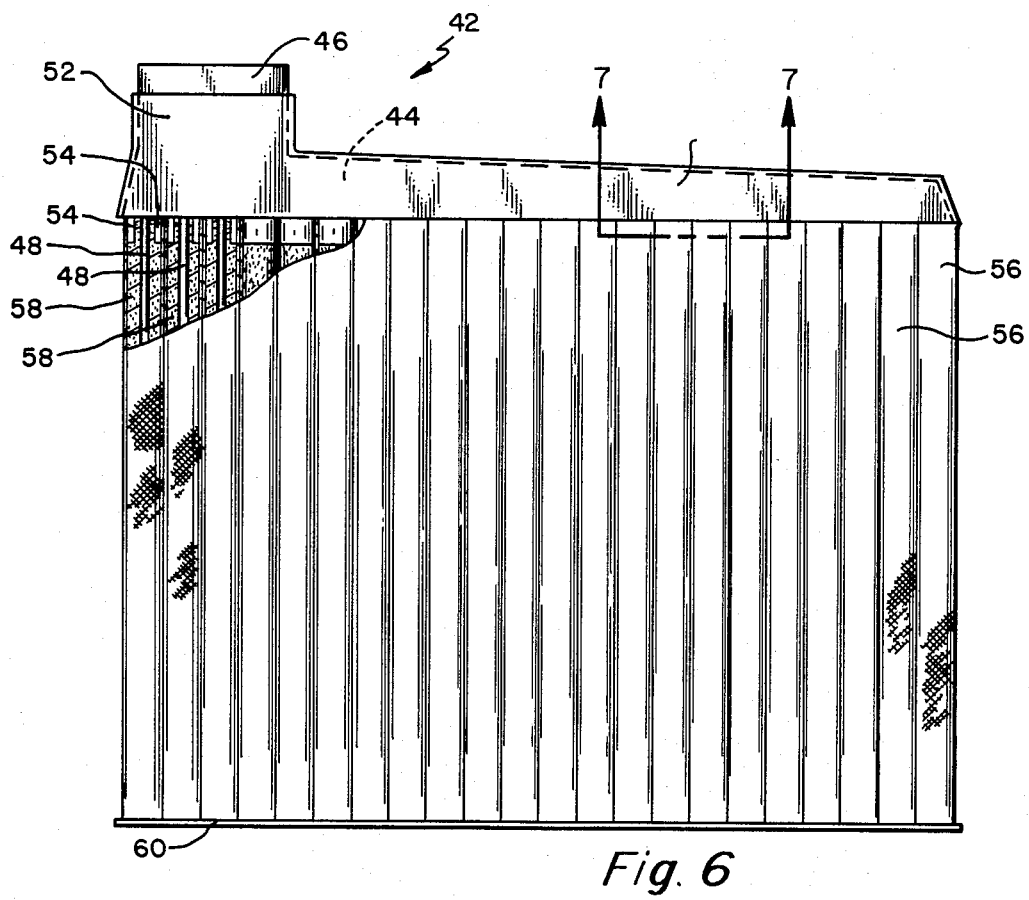
FIG. 6 is a front view in partial cross-section, of a positive tubular electrode of the present invention including a grid complement.
Figure 7:
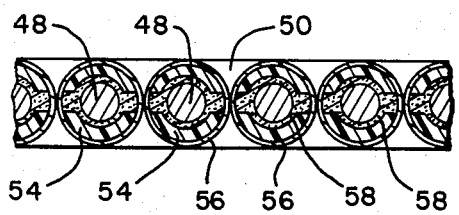
FIG. 7 is a fragmentary cross-sectional view, taken along the line 7—7 of FIG. 6.

An electrode of the invention including a plastic grid complement member similar to that disclosed in the above-referenced U.S. Patent is illustrated in FIGS. 6 and 7, and is generally denoted by the arrow 42. Included in electrode arrow 42 is a grid structure fabricated from a lead alloy and comprising a top bar 44, a lug 46, and a plurality of spaced-apart spines as 48 depending from the top bar 44. It is pointed out that top bar 44 and lug 46 may take different forms. It is also pointed out that the spines as 48 do not include enlarged upper portions corresponding to portions as 10 of FIG. 1.

Overlying and substantially enclosing the top bar 44 and a portion of lug 46 is a plastic grid complement member comprising a top bar enclosure part 50, a lug enclosure part 52, and a plurality of tube insert parts as 54 depending from top bar enclosure part 50.

Tube members as 56 are arranged to substantially surround the spines as 48, and are received over tube insert parts as 54 in fitted relationship therewith. Active material portions as 58 are received in tube members as 56, and the lower ends of the said tube members are closed by a bottom bar member 60 engaged in fitted relationship therewith.

It is pointed out that tube insert parts as 54 perform an important function in refusing excessive spine corrosion as disclosed in U.S. Pat. No. 4,202,936 (Guimond et al), which also discloses a differing form of grid complement member. Current density at upper portions of the spines as 48 is reduced by means of these tube insert parts as 54, particularly at the most vulnerable portions of the spines as 48, where the said spines are joined to the top bar 44. Use of plastic coverings without this feature may result in excessive corrosion of these portions of the said spines.

It is also pointed out that these electrodes must be designed and fabricated such that they satisfy Criteria 1–3 disclosed above, and that they must be subjected to the deliberate spine corrosion process to provide the high-density active material zones as also disclosed above.

The current trend of the lead-acid battery art is toward the use of antimony-free lead alloys in the fabrication of grid structures. Employment of such alloys may reduce self-discharge, improve charging efficiency and reduce maintenance. However, when such alloys are used there is a tendency for extremely thin barrier layers of PbO to form at the interface between the grid spines and the active material portions due to a lack of sulfate ions. It has been found that these barrier layers form most readily on smooth, even surfaces and rarely, if ever, form on coarse, corroded surfaces.

It has been found that electrodes fabricated according to the criteria disclosed above and subjected to the deliberate spine-corrosion process also disclosed above do not develop these PbO barrier layers. After initial fabrication the density of the $PbO_2$ active material portions is sufficiently low so that electrolyte acid will reach the surface of the spines, precluding formation of PbO while also corroding the spines. After this the rough, corroded spine surfaces preclude the formation of the barrier layers.

I claim:

1. A positive tubular electrode for a lead-acid battery, the said electrode including a grid structure comprising a top bar, a lug, and a plurality of spaced-apart spines depending from the top bar, a plurality of tube members arranged around the spines such that one spine is enclosed by each tube member, active material portions received in the tube members and the lower ends of the said tube members being closed by a bottom bar part, characterized in that the ratio between a calculated weight of formed, dry active material received in each tube member to the weight of the spine enclosed by that tube member is restricted to a maximum value of 1.5:1.

2. An electrode according to claim 1, further characterized in that the ratio between the lateral cross-sectional area enclosed by each tube and the lateral cross-sectional area of the spine enclosed by that tube is restricted to a maximum value of 5.0:1.

3. An electrode according to claim 2, further characterized in that the distance between the inner wall of each tube member and the surface of the spine enclosed by that tube member is restricted to a maximum value of 2.5 mm.

4. An electrode according to claim 2, further characterized in that the distance between the inner wall of each tube member and the surface of the spine enclosed by that tube member is restricted to a maximum value of 1.8 mm.

5. A positive tubular electrode for a lead-acid battery, the said electrode including a grid structure comprising a top bar, a lug, and a plurality of spaced-apart spines depending from the top bar, a plurality of tube members received over the spines such that the length of each spine is substantially surrounded by a tube member, active material portions received in the tube members and the lower ends of the said tube members being closed by a bottom bar part, characterized in that the ratio between a calculated weight of formed, dry active material received in each tube member to the weight of the spine surrounded by that tube member is restricted to a maximum value of 1.5:1, and the ratio between the lateral cross-sectional area enclosed by each tube member and the lateral cross-sectional area of the spine over which that tube member is received is restricted to a maximum value of 5.0:1.

6. An electrode according to claim 5, further characterized in the grid structure being fabricated from an antimony-free lead alloy.

7. An electrode according to claim 5, further characterized in the top bar and a portion of the lug being covered by a plastic grid complement member.

8. An electrode according to claim 5, further characterized in the tube members being fabricated from an expandable material operable to limit the expansion of the lateral cross-sectional area enclosed by each tube member to 20%.

9. An electrode according to claim 8 further characterized in the tubes being fabricated from polyester yarns.

10. An electrode according to any one of claims 5 through 9, further characterized in that the distance between the surface of each spine and the inner wall of the tube member surrounding that spine is restricted to a maximum value of 2.5 mm.

11. An electrode according to any one of claims 5 through 9, further characterized in that the distance between the surface of each spine and the inner wall of the tube member surrounding that spine is restricted to a maximum value of 1.8 mm.

12. A positive tubular electrode for a lead-acid battery, the said electrode including a grid structure comprising a top bar, a lug, and a plurality of spaced-apart lead alloy current carrying spines depending from the top bar, a plurality of tube members arranged around the spines such that one spine is enclosed by each tube member, active material portions comprising a lead oxide received in the tube members and the lower ends of the said tube members being closed by a bottom bar part, and wherein:

(a) the ratio between a calculated weight of formed dry active material when filled into a tube member and the weight of the spine enclosed by the tube member; and (b) the ratio between the lateral cross-sectional area enclosed by the tube member to the lateral cross-sectional area of the spine enclosed by the tube member;

are of sufficient value to produce spines sufficiently thick such that, during battery operation, the spines corrode to produce a high density zone of active material about the spine of about 4.8 gm/cm$^3$ or higher while leaving a spine cross-sectional area sufficient to carry a predetermined battery current.

13. The electrode of claim 12 characterized in that the ratio in part (a) is restricted to a maximum value of 1.5:1.

14. An electrode according to claim 12, characterized in that the ratio in part (b) is restricted to a maximum value of 5.0:1.

15. An electrode according to claim 14 further characterized in that the distance between the inner wall of each tube member and the surface of the spine enclosed by that tube member is restricted to a maximum value of 2.5 mm.

16. An electrode according to claim 14, further characterized in that the distance between the inner wall of each tube member and the surface of the spine enclosed by that tube member is restricted to a maximum value of 1.8 mm.

17. A positive tubular electrode for a lead-acid battery, the said electrode including a grid structure comprising a top bar, a lug, and a plurality of spaced-apart lead alloy current carrying spines depending from the top bar, a plurality of tube members received over the spines such that the length of each spine is substantially surrounded by a tube member, active material portions received in the tube members and the lower ends of the said tube members being closed by a bottom bar part, in which the ratio between a calculated weight of formed, dry active material received in each tube member to the weight of the spine surrounded by that tube member is restricted to a maximum value of 1.5:1, and the ratio between the lateral cross-sectional area enclosed by each tube member and the lateral cross-sectional area of the spine over which that tube member is received is restricted to a maximum value of 5.0:1 to provide spines of sufficient dimensions such that during battery operation, the spines may corrode to form a dense layer of active material about the remaining portions of the spine which substantially precludes further spine corrosion and wherein said dense layer contributes to the active material and wherein said corrosion is substantially terminated prior to the point at which the cross-sectional area of the spines are incapable of conducting the requisite battery current.

* * * * *